US008781447B2

(12) United States Patent
O'Mahony et al.

(10) Patent No.: US 8,781,447 B2
(45) Date of Patent: Jul. 15, 2014

(54) TECHNIQUES TO WIRELESSLY TRANSMIT DATA

(75) Inventors: Barry A. O'Mahony, Banks, OR (US); Jeffrey R. Foerster, Portland, OR (US); V. Srinivasa Somayazulu, Portland, OR (US); Ozgur Oyman, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 611 days.

(21) Appl. No.: 12/889,625

(22) Filed: Sep. 24, 2010

(65) Prior Publication Data

US 2012/0077466 A1    Mar. 29, 2012

(51) Int. Cl.
*H04L 1/06* (2006.01)
*H04B 7/00* (2006.01)
*G06F 7/00* (2006.01)

(52) U.S. Cl.
USPC ......... 455/414.1; 370/235; 370/310; 709/227

(58) Field of Classification Search
USPC ............ 455/414.1, 426.1, 566; 370/329, 331, 370/310, 235; 709/227
See application file for complete search history.

(56) References Cited

U.S. PATENT DOCUMENTS

| 7,924,943 | B2 * | 4/2011 | Kim et al. | 375/299 |
|---|---|---|---|---|
| 8,509,173 | B2 * | 8/2013 | Kim et al. | 370/329 |
| 2009/0061783 | A1 * | 3/2009 | Choi et al. | 455/68 |
| 2009/0168650 | A1 * | 7/2009 | Kesselman | 370/235 |
| 2010/0246506 | A1 * | 9/2010 | Krishnaswamy | 370/329 |

FOREIGN PATENT DOCUMENTS

WO    2012/040667 A1    3/2012

OTHER PUBLICATIONS

International Search Report and Written Opinion for PCT Patent Application No. PCT/US2011/053155, mailed on Feb. 17, 2012, 9 pages.
LG Electronics, "Amendment Proposal for TV White Spaces Operation", IEEE 802.11 Working Group, IEEE 802.11-10/10263r1, Mar. 18, 2010, 19 pages.
M. Nekovee, et al., "Cognitive Radio Access to TV White Spaces: Spectrum Opportunities, Commercial Applications and Remaining Technology Challenges", In: Proceedings of IEEE DySPAN 2010, Apr. 6-9, 2010.
Jianfeng Wang, et al., "First Cognitive Radio Networking Standard for Personal/Portable Devices in TV White Spaces", In: Proceedings of IEEE DySPAN 2010, Apr. 6-9, 2010.
"MediaFLO", From Wikipedia, the free encyclopedia, Retrieved on Oct. 20, 2010, Web Page available at: http://en.wikipedia.org/wiki/MediaFLO.

* cited by examiner

*Primary Examiner* — Nizar Sivji
(74) *Attorney, Agent, or Firm* — Buckley, Maschoff & Talwalkar LLC

(57) ABSTRACT

Techniques are described to transmit multimedia content to a mobile station using a combination of a mobile/cellular network as well as a TV Whitespace (TVWS) network. Scalable video coding can be used to transmit a baseline layer of multi-media content using the mobile/cellular network and one or more enhancement layers over the TVWS channels. Joint source-channel coding can be used to adjust the transmission scheme used by mobile/cellular and/or TVWS based on end user experience.

11 Claims, 5 Drawing Sheets

TECHNIQUES TO WIRELESSLY TRANSMIT DATA

RELATED APPLICATIONS

This application is related to U.S. patent application Ser. No. 12/655,091, entitled "Distortion-Aware Multiple Input Multiple Output Communications," inventors Oyman and Foerster, filed Dec. 23, 2009.

FIELD

The subject matter disclosed herein relates generally to techniques for transmitting signals to mobile devices.

RELATED ART

The White Spaces Coalition plans to deliver high speed broadband internet to consumers in the United States via existing "white space" in unused television frequencies between 54-698 MHz (TV Channels 2-51). For example, an IEEE 802.22 PAR suggests a range of 54-862 MHz. The coalition expects speeds of 80 Mbps and above and 400 to 800 Mbps for white space short-range networking. In the United States, the Federal Communications Commission (FCC) issued a Report and Order, permitting operation of unlicensed transmitters on TV channels locally unoccupied by licensed devices, so-called "white space" (e.g., 54 MHz to 698 MHz). Geographies other than the United States are looking into permitting unlicensed television white space operation as well.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Video data is an ever-increasing percentage of internet usage, and now represents the majority of internet bandwidth used. Streaming video to mobile/cellular devices is putting an increasing strain on those networks. At least for cases of broadcast video viewed by a significant number of mobile subscribers in a given area, as well as for the case of "on-demand" streaming or downloaded video, various embodiments potentially offer relief to network congestion by off-loading video transmission to a wireless transmission facility operating in a different spectrum band than that of the mobile/cellular network frequency. Various embodiments provide for augmented transmissions to take place on TV band White Space channels (e.g., 54 MHz to 698 MHz).

Some embodiments permit transmission at least of video and audio in current TV bands, not outside the bands in former TV spectrum. Transmission can take place on an unlicensed basis, under the FCC Part 15 TV white space regulations. Transmissions may be take place cooperatively between a two-way cellular/mobile network (e.g., WiMax or other type) and a television white space (TVWS) band. For example, sharing information about the TVWS band over the two-way network (e.g., MCS recommendations for transmissions over the TVWS bands) can take place. In some cases, sending of complementary information can take place across both the TVWS and mobile/cellular network. Scalable or multi-descriptive video compression techniques can be used to transmit complementary information. In some cases, the TVWS spectrum can be employed for peer-to-peer (p2p) services with control signals carried over the cellular channels.

Roaming mobile devices may receive the transmissions over any number of channels in the TVWS space, as opposed to a single fixed frequency. Coordination between the mobile/cellular network and the TVWS transmitters can take place to update the mobile device as to available TVWS transmitters and their channels of operation, based in part on geo-location information of the mobile device.

Figure 1:
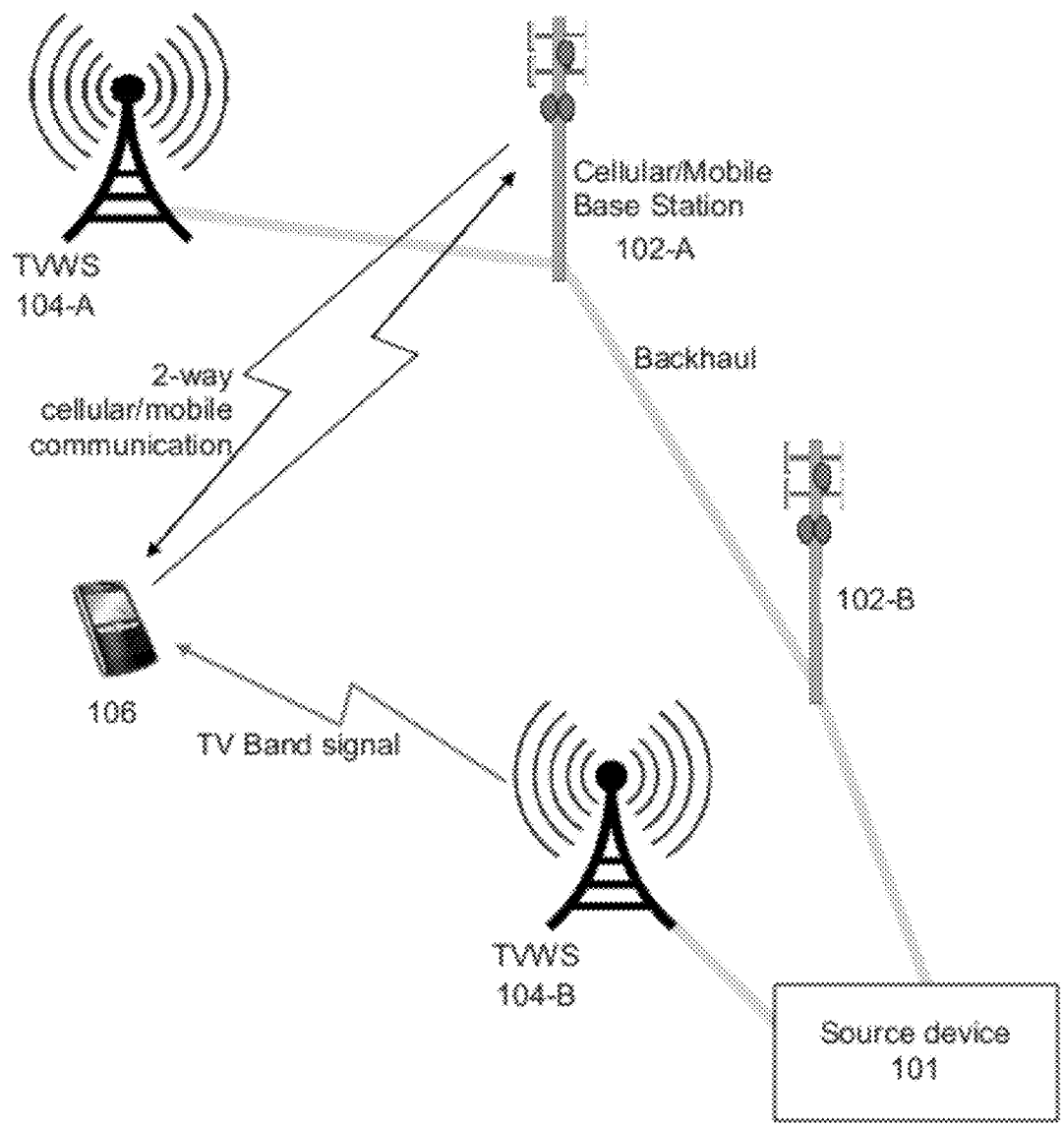
FIG. 1 depicts an example system that can use a television white space network and at least one other network to communicate with mobile devices.

FIG. 1 depicts an example system that includes: (1) a source device 101; (2) a cellular/mobile network having base stations 102-A and 102-B; (3) a TVWS network having one or more associated TVWS transceivers 104-A and 104-B; and (4) mobile device 106.

Source device 101 may be a continuous or finite source of multimedia communication, such as video, audio, voice over IP, speech and audio communications, and/or mobile TV.

For example, cellular/mobile network can utilize 3G networks, 4G networks, cellular networks, WWANs, 3GPP networks, LTE networks, LTE-Advanced networks, and Mobile TV, and the like. Cellular/mobile network can use any digital cellular technologies, including: Global System for Mobile Communications (GSM), General Packet Radio Service (GPRS), Code Division Multiple Access (CDMA), Evolution-Data Optimized (EV-DO), Enhanced Data Rates for GSM Evolution (EDGE), 3GSM, Digital Enhanced Cordless Telecommunications (DECT), Digital AMPS (IS-136/TDMA), and Integrated Digital Enhanced Network (iDEN). Cellular/mobile network can be a wireless local area network (WLAN), wireless personal area network (WPAN), wireless wide area network (WWAN) and wireless metropolitan area network (WMAN). For example, cellular/mobile network can include IEEE 802.11-based LANs, IEEE 802.15-based PANs and IEEE 802.16-based WANs where MIMO technologies have been adopted and it is desirable to reliably communicate multimedia content (e.g., the IEEE 802.11 standard, IEEE std., 802.11-2009, published Oct. 29, 2009, or future implementations thereof; the IEEE 802.15 standard, IEEE std., 802.15-2006, published September 2006, or future implementations thereof; and the IEEE 802.16 standard, IEEE std., 802.16-2009, published 2009, or future implementations thereof). Further, while several specific standards have been set forth herein as examples of suitable applications, implementations herein are not limited to any particular standard or protocol.

The cellular/mobile network can be compliant with any variety of IEEE 802.16 or LTE. In the downstream or downlink case, transmitters may be interchangeably referred to as a base station (BS) or enhanced Node B (eNB) or access point (AP). In this downlink case, the receivers and/or above may be interchangeably referred to as a mobile station (MS) or subscriber station (SS) or user equipment (UE) or station (STA) at the system level herein. Further, the terms BS, eNB, and AP may be conceptually interchanged, depending on which wireless protocol is being used, so a reference to BS herein may also be seen as a reference to either of eNB or AP. Similarly, a reference to MS or SS herein may also be seen as a reference to either of UE or STA.

TVWS transmitters 104-A and 104-B can use unused broadcast TV spectrum for example between 54-698 MHz to transmit or receive signals. For example, TVWS network can use any standards such as but not limited to evolving IEEE 802.11 af, IEEE 802.19.1, IEEE 802.22, IEEE SCC41 and White Spaces Coalition.

TVWS transmitters 104-A and 104-B could use any number of broadcast waveforms, including the ATSC-M/H or DVB-H standards to transmit one or more MPEG-4 or H.264 encoded video streams to device 106. Alternately, other modulations, such as Orthogonal Frequency-Division Multiplexing (OFDM), and other data formatting, may be used. Video encoding other than MPEG-4 may also be used. Video content transmitted by the TVWS transmitter may be watched in real-time on the mobile device's video display, and/or may be stored by the mobile/device for later viewing.

Mobile device 106 is capable of 2-way communications on the cellular/mobile network and 1-way (receipt) in a TVWS network. Mobile device 106 is capable of displaying a video signal, and optionally, rendering any associated audio channels.

For content such as voice, data, commands, and video, 2-way communication with the mobile device 106 can occur via the cellular/mobile network, as in a conventional network. In various embodiments, some video transmissions to mobile device 106 can occur via signals transmitted in the TVWS bands using at least one of transmitters 104-A and 104-B. For example, broadcast video content that is desired to be viewed by a significant number of subscribers in the vicinity of the TVWS transmitter could be transmitted by TVWS transmitters operating in broadcast mode. This could serve relieve bandwidth use by the cellular/mobile network to transmit multi-media because it could replace many unicast transmissions (i.e., distinct transmission to each mobile device), a multicast transmission on the cellular/mobile network, or a combination of both the unicast and multicast transmissions.

In various embodiments, TVWS transmitters 104-A and 104-B operate under the Fixed Device portion of the FCC rules, because this portion permits transmission power of up to 4W EIRP. In some cases, TVWS transmitters could operate as Personal/Portable devices as well, albeit at reduced power levels.

The mobile device may be in motion while video is being watched, and therefore moving between the coverage areas of more than one TVWS transmitter. The TVWS transmitters may form a single-frequency network (SFN) or the transmitters may operate in different TVWS channels as the local channel availability dictates. Roaming and hand-off information, possibly 2-way, may be transmitted as needed across the cellular/mobile network. Alternately, the mobile device may use spectrum sensing to determine when it leaves and/or enters the coverage area of a TVWS transmitter.

In some embodiments, a cellular/mobile network uses location information about the mobile networked device to inform the mobile device about which associated TVWS transmitter(s) are operating within its reception range. The mobile devices could use spectrum sensing to determine which TVWS transmitters associated with the cellular/mobile network are operating nearby.

In some embodiments, video transmission to a mobile device could be handed off to the cellular/mobile network from the TVWS transmitter in various cases. For example, one case is when the mobile device roams into an area without reception from a TVWS transmitter. Another case is when there is no bandwidth capability for TVWS transmitters to transmit video.

Scalable video encoding could be used, whereby a lower resolution multi-media stream is transmitted via the TVWS transmitter(s) and the multi-media stream is augmented with quality enhancement layers and additional details such as metadata and side-information. Quality enhancement layers and additional details such as metadata and side-information can be transmitted via the cellular/mobile network in instances where that network is lightly loaded. For example, meta data and side information can convey Closed Captioning, Electronic Program Guide (EPG), scene, object, or actor identification information, and so forth. In some cases, quality enhancement layers and additional details such as metadata and side-information can be transmitted using the TVWS transmitters.

In some cases, the video services provider may employ scalable video encoding of the video and request to transmit a base quality layer of video over the cellular/mobile network and request to transmit one or more enhancement layers over the TVWS channels. Techniques for scalable video encoding are described, for example, in H. Schwarz, D. Marpe, and T Wiegand, "Overview of the Scalable Video Coding Extension of the H.264/AVC Standard," Circuits and Systems for Video Technology, IEEE Transactions, Volume 17, Issue 9, pp. 1103-1120 (2007). Base layer reliability can be higher than enhancement layer because enhancement layer depends on reliable base layer. The TVWS channels offer a network operator a capability to transmit enhanced client capabilities using both a TVWS radio and the cellular radio to provide different tiers of service and revenue to customers while optimizing the loading of their valuable cellular spectrum.

In some embodiments, scalable video encoding could be used, whereby a lower resolution video stream is transmitted via the TVWS transmitter(s), augmented with additional details sent via the cellular/mobile network in instances where that the cellular/mobile network is lightly loaded.

In another embodiment, the cellular/mobile network uses location information about mobile devices to inform the mobile devices about which associated TVWS transmitter(s) (personal and/or portable class) are operating within a reception range of the mobile device. The mobile device(s) which desire to operate different peer-to-peer (p2p) video services (e.g., sharing, video conferencing, p2p content caching) can use the TVWS channels for data reception while the control signals can be transmitted using cellular channel(s).

Video content transmitted by the TVWS transmitted may be watched in real-time on the mobile device's video display, and/or may be stored by the mobile/device for later viewing. Content may consist of channels subscribed to a priori by the subscriber, or alternately, may be Pay Per View content, with ordering and authentication taking place over the cellular/mobile network.

Figure 2:
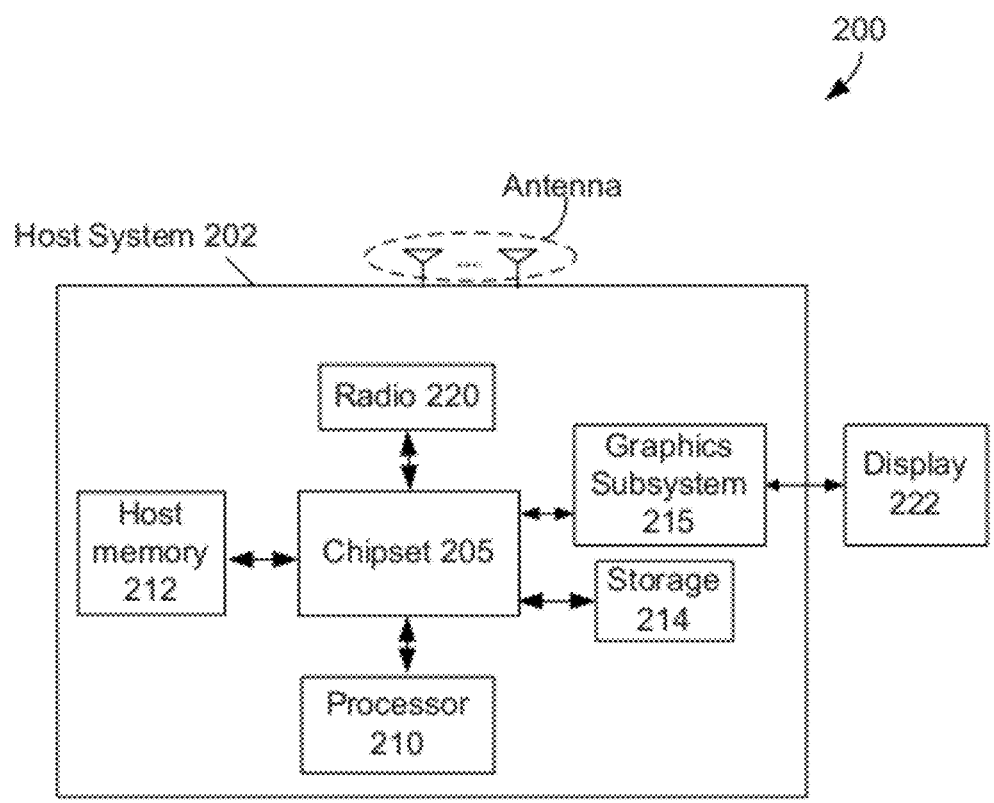
FIG. 2 depicts an example of a mobile device in accordance with various embodiments.

FIG. 2 depicts an example of a mobile device in accordance with various embodiments. Computer system 200 may include host system 202 and display 222. Computer system 200 can be implemented in a handheld personal computer, mobile telephone, set top box, or any computing device. Any type of user interface is available such as a keypad, mouse, touch screen, and/or gesture or motion sensing. Host system 202 may include chipset 205, processor 210, host memory 212, storage 214, graphics subsystem 215, and radio 220. Chipset 205 may provide intercommunication among processor 210, host memory 212, storage 214, graphics subsystem 215, and radio 220. For example, chipset 205 may include a storage adapter (not depicted) capable of providing intercommunication with storage 214.

Processor 210 may be implemented as Complex Instruction Set Computer (CISC) or Reduced Instruction Set Computer (RISC) processors, x86 instruction set compatible processors, multi-core, or any other microprocessor or central processing unit.

Host memory 212 may be implemented as a volatile memory device such as but not limited to a Random Access Memory (RAM), Dynamic Random Access Memory (DRAM), or Static RAM (SRAM). Storage 214 may be implemented as a non-volatile storage device such as but not limited to a magnetic disk drive, optical disk drive, tape drive, an internal storage device, an attached storage device, flash memory, battery backed-up SDRAM (synchronous DRAM), and/or a network accessible storage device.

Graphics subsystem 215 may perform processing of images such as still or video for display. An analog or digital interface may be used to communicatively couple graphics subsystem 215 and display 222. For example, the interface may be any of a High-Definition Multimedia Interface, DisplayPort, wireless HDMI, and/or wireless HD compliant techniques. Graphics subsystem 215 could be integrated into processor 210 or chipset 205. Graphics subsystem 215 could be a stand-alone card communicatively coupled to chipset 205.

Radio 220 may include one or more radios capable of transmitting and receiving signals in accordance with applicable wireless standards such as but not limited to any version of IEEE 802.11 and IEEE 802.16. For example, radio 220 may include at least a physical layer interface and media access controller. In addition, radio 220 includes the capability to communicate with TVWS transmitters. For example, in some cases, radio 220 can receive content from TVWS transmitters.

Wireless communications involve the transmission of a continuous source over a noisy channel. Common examples are speech communications, multimedia communications, mobile TV, mobile video and broadcast streaming. In such communications, the source is encoded and compressed into a finite stream of bits and the bit stream is then communicated over the noisy channel. Source coding can be carried out to convert the continuous source into a finite stream of bits. Channel coding can be performed to mitigate the errors in the bit stream introduced by the noisy channel. At the receiver end, a channel decoder recovers the bit stream from its noisy version, and a source decoder reconstructs the multimedia source from the recovered compressed version.

During transmission of multimedia communication, minimizing distortion between the original multimedia source at the transmitter and its reconstructed version at the receiver can provide a better multimedia quality of experience for a user. In this context, separation of source coding and channel coding may no longer be desirable, for instance, when the channel state information (CSI) is not available at the transmitters. Joint source-channel coding (JSCC) techniques may aim to optimize codec and radio system parameters in order to enhance user quality of user experience by jointly performing source compression and channel coding such that the resulting end-to-end distortion for wireless multimedia communication can be potentially minimized by accounting for the impact of both quantization errors (due to lossy compression) and channel-induced errors (due to fading and noise).

U.S. patent application Ser. No. 12/655,091, entitled "Distortion-Aware Multiple Input Multiple Output Communications," inventors Oyman and Foerster, filed Dec. 23, 2009 (hereafter "patent application") proposed techniques for MIMO link adaptation toward enhanced multimedia communications with the motivation of applying JSCC-based cross-layer optimizations to PHY/MAC layer design for wireless systems. In particular, the patent application introduced distortion-aware MIMO link adaptation techniques toward the selection of modulation and coding schemes (MCS), MIMO space-time modulation (including MIMO diversity and spatial multiplexing), rate/power adaptation, MIMO precoding and MIMO antenna selection schemes to potentially minimize end-to-end distortion. In order to provide distortion-aware link adaptation techniques at the PHY/MAC layers, the patent application also discussed passing application-layer parameters of codec-level multimedia processing (e.g., rate-distortion function of the multimedia stream) from the application layer to the PHY/MAC layers. Furthermore, distortion-aware link adaptation techniques described in the patent application covered both (i) open loop link adaptation methods in which distortion-minimizing link adaptation parameters are determined at the transmitter and (ii) closed loop link adaptation methods in which distortion-minimizing link adaptation parameters are determined by the receiver and fed back to the transmitter.

Some embodiments use link adaptation methods for TVWS transmission assisted by a cellular/mobile network. In some embodiments, the cellular/mobile network informs the TVWS transmitter about some relevant codec-level parameters concerning application-layer multimedia processing (e.g., rate-distortion function for a video stream) in order to attempt to optimize the broadcast/multicast/unicast communication of the multimedia content from the TVWS transmitter. This can lead to enhanced user quality of experience (QoE). In addition, the cellular/mobile network may collect feedback information from the mobile terminals (e.g., by utilizing channel quality indicator (CQI) feedback mechanisms in WiMAX or in LTE) about the measured channel quality over the TVWS bands and perceived multimedia quality over the TWVS bands in order to enable adaptation of source coding parameters at the application layer. The cellular/mobile network may provide distortion-minimizing link adaptation recommendations (e.g., modulation-and-coding scheme (MCS)) for transmissions over the TVWS bands.

Using this feedback information from the mobile terminals, the cellular/mobile network may also influence the channel-level adaptive modulation and coding (e.g., by signaling distortion-minimizing MCS selection, MIMO space-time modulation, MIMO precoding and MIMO antenna selection parameters) of the transmissions from the TVWS transmitter by messaging such adaptation information to the TVWS transmitter. Controlling modulation and coding may potentially minimize end-to-end distortion and enhance multimedia quality for the communication over the TVWS bands.

In some cases, the receiver may also be distortion-aware and provide feedback to the transmitter for enabling the transmitter to be distortion aware. For example, the receiver may determine link adaptation parameters to minimize end-to-end distortion and provide these parameters as feedback to the transmitter, which then uses the provided parameters. In this optional setting, a transmitter may also send the rate-distortion characteristics of the source to the receiver so that the distortion-aware receiver can utilize this information in determining the link adaptation parameters to achieve the minimized end-to-end distortion. Rate-distortion characteristics can be transmitted using a TVWS network or cellular/mobile network to the mobile device.

Because the distortion-aware transmitter takes distortion minimizing parameters into consideration during the encoding stage, the system is potentially able to achieve minimized end-to-end distortion between the source to be transmitted and the transmitted reconstructed source.

Figure 3:
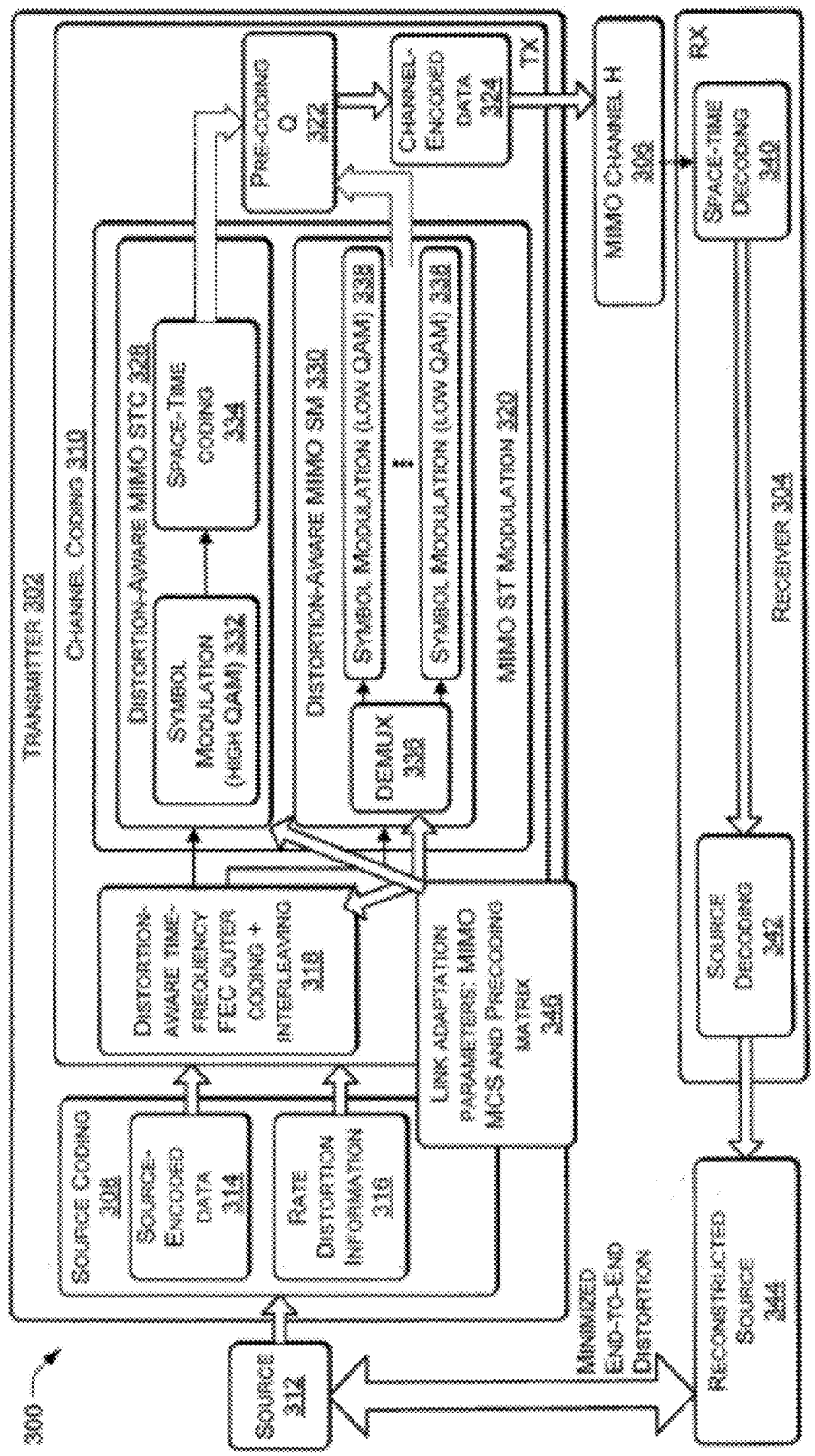
FIG. 3 illustrates a block diagram of an example of an open-loop distortion-aware MIMO link adaptation architecture.

FIG. 3 illustrates a block diagram of an example of an open-loop distortion-aware MIMO link adaptation architecture 300 according to some implementations herein, in which link adaptation parameters are determined and applied at the transmitter. Transmitter 302 can be used in a TVWS transmitter whereas receiver 304 can be used in a mobile device.

In the architecture of FIG. 3, a transmitter 302 is able to communicate with a receiver 304 via a MIMO channel H 306. MIMO channel 306 can be communicated through TVWS spectrum air interface. In the illustrated implementation, transmitter 302 includes a source encoder, shown as source coding block 308, and a channel encoder, shown as channel coding block 310. The source coding block 308 can be configured to compress or otherwise encode a source 312, such as a multimedia source, to create source-encoded data 314, and pass the source-encoded data 314 along with rate-distortion information 316 of the source-encoded data 314 to the channel coding block 310. For example, in the case that source 312 is a video received by source coding block 308 as a stream of video information, source coding block 308 encodes (e.g., compresses) the received stream of video information into a format suitable for transmission (one non-limiting example of a suitable format is the H.264/MPEG-4 AVC video coding standard developed by the ITU-T Video Coding Experts Group (VCEG) together with the ISO/IEC Moving Picture Experts Group (MPEG), finalized May, 2003, or the like). Furthermore, in the case in which the source 312 is an analog stream, source coding block 308 further converts the analog stream into a digital form during encoding.

In some cases, the encoding carried out by the source coding block 308 is at least partially dependent upon the nature of the multimedia source as well as the compression capabilities of the codec or source encoder. Further, according to implementations herein, rate distortion information 316 can be determined for the encoded source and this information is also passed to the channel coding block 310 to taken into account for distortion awareness during the channel encoding of the source-encoded data 314. For example, rate distortion characteristics for various codecs and source encoding of various different media types can be determined and/or observed, and passed to the channel coding block 310 by the source coding block 308 based upon the type of source coding used by source coding block 308. The rate-distortion characteristics of the source utilized at the channel coding block 310 for link adaptation purposes may also be dependent on other application and network layer functionalities, such as frame type (e.g., I-frame, P-frame or B-frame), network layer packetization and transmission framework used toward passing the compressed source from the codec to the channel encoder (e.g., in RTP/UDP), type of layering in the case of advanced source compression methods such as scalable video coding (SVC) and application-layer forward error correction FEC (e.g., raptor codes, Reed-Solomon codes, etc.).

The channel coding block 310 can include a time-frequency forward error correction (FEC) outer coding and interleaving block 318, followed by a MIMO space-time (ST) modulation block 320, which is then followed by a MIMO precoding block 322 to produce channel-encoded data 324.

Following precoding, the channel-encoded data can be transmitted by multi-antenna transmission to the receiver 304 over MIMO channel 306. The MIMO space-time modulation block 320 can either operate in the MIMO diversity mode, as distortion-aware MIMO STC block 328, or in the MIMO spatial multiplexing mode as distortion-aware MIMO SM block 330. In the MIMO diversity mode, output bits of the FEC coding and interleaving block 318 can be first modulated by symbol mapping in a symbol modulation block 332 at high quadrature amplitude modulation (QAM), and then re-encoded using a space-time code (STC) into multiple spatial streams at space-time coding block 334.

Alternatively, in the MIMO spatial multiplexing mode, the coded/interleaved bits output from the FEC coding and interleaving block 318 can be de-multiplexed into multiple spatial streams by a DEMUX block 336, and each stream can then be modulated by symbol mapping in a plurality of symbol modulation blocks 338 at low QAM. The decision on whether to use the distortion-aware MIMO STC block 328, or the distortion-aware MIMO SM block 330 can be dependent upon the determined distortion-aware criteria for MIMO MCS selection, as discussed herein.

At the receiver end, a space-time decoder block 340 in receiver 304 can be configured to recover the transmitted source data from a noisy corrupted received version transmitted over the MIMO wireless channel, following the multi-antenna reception. The recovered data stream is passed to a source decoding block 342, which reconstructs the source with the goal of minimizing the distortion between the original source and a reconstructed source 344. For example, in the case of a multimedia source, such as an audiovisual multimedia content item (e.g., television, movie, video, or the like), a possible goal is to minimize distortions introduced by the encoding and decoding of the content item and the transmission of the content item over a noisy transmission channel.

The source-encoded data 314 received from the source coding block 308 can be passed through the channel encoding blocks 318, 320, 322 before multi-antenna transmission. According to implementations herein, radio-level channel encoder blocks 318, 320, 322 can have the property of "distortion-awareness" because these radio-level channel encoder blocks 318, 320, 322 are configured to execute implementations of the distortion-aware MIMO link adaptation strategy for MIMO MCS selection and precoding. Based upon techniques described in the patent application, link adaptation parameters 346, i.e., MIMO MCS (such as FEC code rate and MIMO space-time modulation scheme) and precoding matrix Q can be determined and provided to the radio-level channel encoder blocks 318, 320, 322 for implementing the distortion awareness of these blocks. Examples of determination of the link adaptation parameters 346 based on known channel conditions for the open-loop implementations are described in the patent application.

For example, link adaptation parameters may include FEC code rate and MIMO space-time modulation for the MIMO MCS scheme and the precoding matrix Q determined based upon the received rate distortion information and statistical information stored at the transmitter for access by the channel encoder. Further, a lookup table or other stored information based upon known statistics (such as SNR values and distortion vectors) of the channel being used may be provided to the channel encoder for determining link adaptation parameters that minimizing end-to-end distortion.

Figure 4:
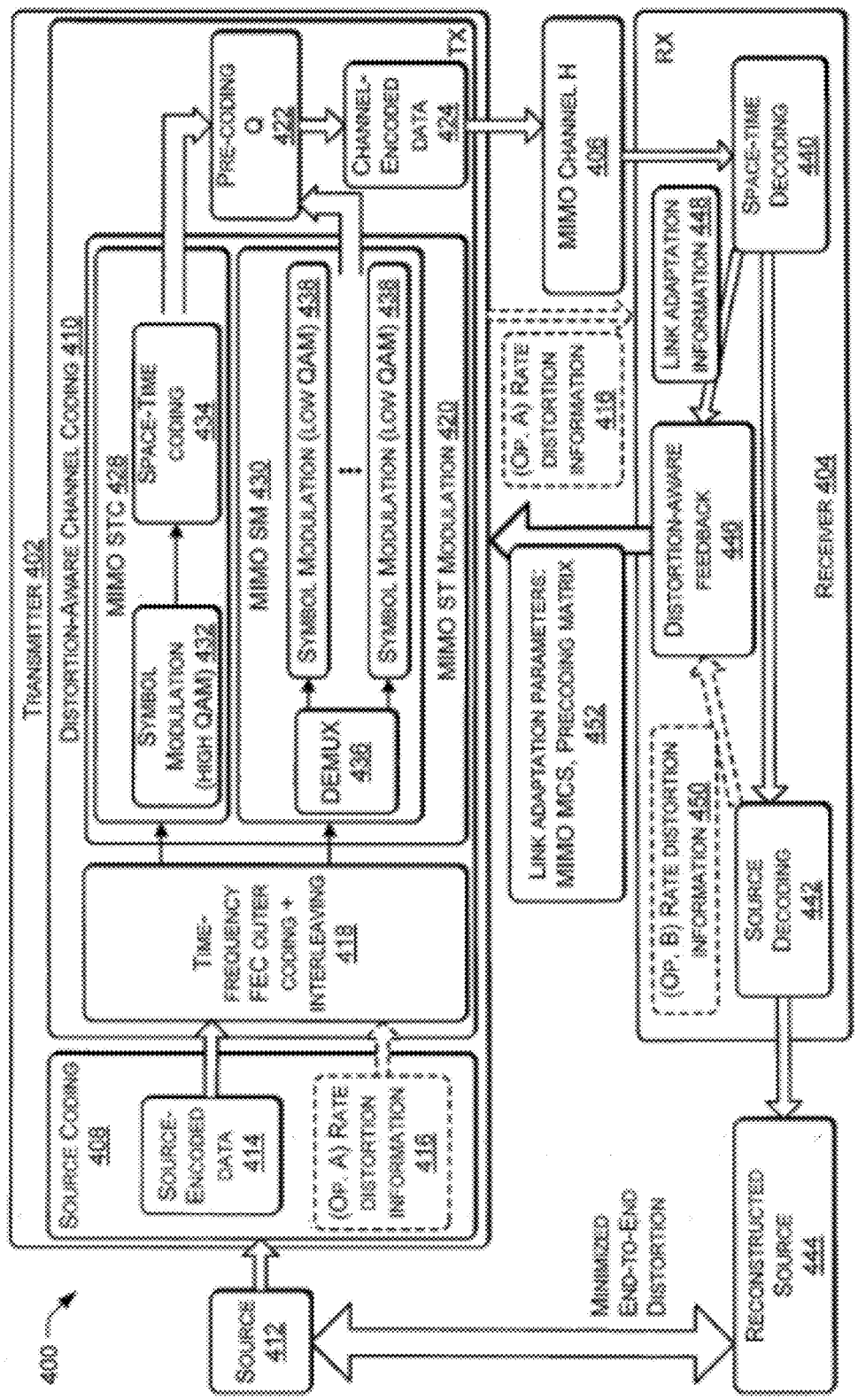
FIG. 4 illustrates a block diagram of an example of a closed-loop distortion-aware MIMO link adaptation architecture.

FIG. 4 illustrates a block diagram of an example of a closed-loop distortion-aware MIMO link adaptation architecture 400 according to some implementations herein, in which link adaptation parameters are determined at the receiver and are fed back for application at the transmitter. Transmitter 402 can be used in a TVWS transmitter whereas receiver 404 can be used in a mobile device.

In the architecture of FIG. 4, similar to that of FIG. 3 described above, a transmitter 402 is able to communicate with a receiver 404 via a MIMO channel 406. MIMO channel 406 can be communicated through TVWS spectrum air interface. In the illustrated implementation, transmitter 402 includes a source encoder, shown as source coding block 408, and a channel encoder, shown as distortion-aware channel coding block 410. The source coding block 408 is configured to compress and otherwise encode a source 412, such as a multimedia source, and pass the source-encoded data 414 along with, in some implementations, rate-distortion information 416 of the source-encoded data 414 to the distortion-aware channel coding block 410. However, in other implementations, it may not be necessary for the source coding block 408 to pass rate distortion information 416 to the channel coding block 410. Instead, as discussed further below, the rate distortion information may be determined directly by the receiver 404 and taken into consideration when preparing feedback that is provided to the distortion-aware channel coding block 410. Hence passing the rate distortion information 416 from the source coding block 408 is used in some implementations of the closed loop architecture, and is labeled as Option A (Op. A) in FIG. 4. Alternatively, or in addition, in other implementations, the rate distortion information may be determined independently at the receiver 404, which is labeled as Option B (Op. B) in FIG. 4, and which is discussed additionally below.

The channel coding block 410 includes a time-frequency forward error correction (FEC) outer coding and interleaving block 418, followed by a MIMO space-time (ST) modulation block 420, which is then followed by a MIMO precoding block 422 to produce channel-encoded data 424, which is sent to receiver 404 over MIMO channel 406 (along with rate-distortion information 416 in the case of Op. A). Similar to the configuration discussed above with reference to FIG. 3, the MIMO ST modulation block 420 can either operate in the MIMO diversity mode as MIMO STC block 428, or in the MIMO spatial multiplexing mode as MIMO SM block 430. In the MIMO diversity mode, output bits of the channel coding and interleaving block 418 are first modulated by symbol mapping in a symbol modulation block 432 at high QAM, and then re-encoded using a space-time code (STC) into multiple spatial streams at space-time coding block 434. Alternatively, in the MIMO spatial multiplexing mode, the coded/interleaved bits output from the coding and interleaving block 418 are de-multiplexed into multiple spatial streams by a DEMUX block 436 and each stream is then modulated by symbol mapping in a plurality of symbol modulation blocks 438 at low QAM. The decision on whether to use the MIMO STC block 428, or the MIMO SM block 430 can be dependent upon the determined distortion-aware criteria for MIMO MCS selection, which is provided to the distortion-aware channel coding block 410 by feedback from the receiver 404.

At the receiver 404, a space-time decoding block 440 is configured to recover the transmitted source data from a noisy corrupted received version transmitted over the MIMO wireless channel, following the multi-antenna reception. The recovered data stream is passed to a source decoding block 442, which reconstructs the source with the goal of minimizing the distortion between the original source 412 and a reconstructed source 444.

For the closed-loop distortion-aware MIMO link adaptation architecture 400 illustrated in FIG. 4, the receiver 404 also includes a distortion-aware feedback block 446 that periodically provides feedback to transmitter 402 for enabling the distortion awareness of the distortion-aware channel coding block 410. For example, the distortion-aware feedback block 446 at the receiver 404 may determine from the space-time decoding block 440 link adaptation information 448 (i.e., the estimated MIMO channel parameters, and the MIMO MCS and precoding matrix Q parameters). The distortion-aware feedback block 446 can use the link adaptation information 448 along with rate distortion information 416 (Op. A) and/or rate distortion information 450 (Op. B) to determine distortion-minimizing link adaptation parameters 452, e.g., a MIMO MCS scheme and precoding matrix Q. After the distortion-minimizing MIMO link adaptation parameters 452 have been determined at the receiver 404 based on receiver's knowledge of the long-term channel variations along with the instantaneous or statistical knowledge of short-term MIMO channel realizations, the link adaptation parameters 452 can be fed back to transmitter 402. Parameters 452 can be fed back to transmitter 402 using a transmitter in a mobile device that communicates using a cellular/mobile network or using the TVWS network.

In addition, according to some implementations, as discussed above, when determining distortion-minimizing MIMO link adaptation parameters 452, the distortion-aware feedback block 446 may also gather the rate-distortion information 450 about the multimedia source from the source decoding block 442 (Op. B). Alternatively, or in addition, transmitter 402 may send rate-distortion information 416 on the source along with channel-encoded data 424 to receiver 404 over the MIMO channel 406 (Op. A), so that distortion-aware feedback block 446 at receiver 404 may utilize this information in determining distortion-minimizing MIMO link adaptation parameters 452. The rate distortion information 416 and/or 450 can be taken into consideration by distortion-aware feedback block 446 when determining the distortion minimizing link adaptation parameters 452, e.g., MIMO MCS and pre-coding matrix, which are then passed to the transmitter 402 through a feedback channel. For example, average distortion values for MIMO MCS and precoding matrix Q can be determined for the instantaneous received SNR and random channel realization based at least on (1) average end-to-end distortion for MIMO diversity mode, (2) average end-to-end distortion for MIMO SM mode with vertical encoding, and (3) average end-to-end distortion for MIMO SM mode with horizontal encoding.

For example, transmitter 402 may be incorporated into a first device that also includes a receiver (not shown), while receiver 404 may be in the incorporated into a second device that also includes a transmitter (not shown), thus enabling the receiver 404 to provide feedback wirelessly to the transmitter 402 such as over MIMO channel 406, or other wireless channel, link, or the like.

Figure 5:
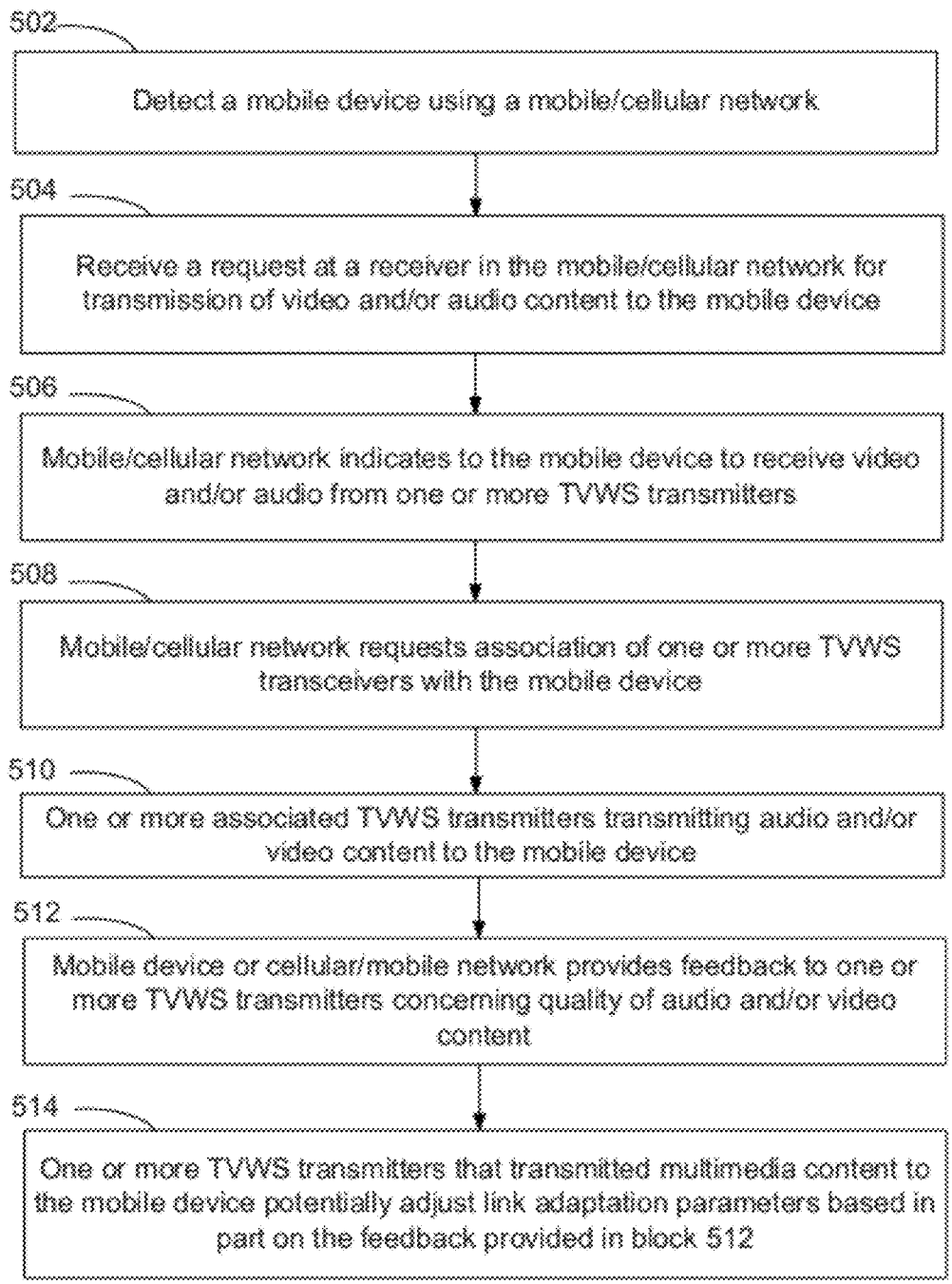
FIG. 5 depicts an example process that can be used to transmit video to a mobile device.

FIG. 5 depicts an example process that can be used to transmit video to a mobile device.

Block 502 includes detecting a mobile device using a mobile/cellular network. Non-limiting examples of a mobile/cellular network are described earlier.

Block 504 includes receiving a request at a receiver in the mobile/cellular network for transmission of video and/or audio content to the mobile device.

Block 506 includes the mobile/cellular network indicating to the mobile device to receive video and/or audio from one or more TVWS transmitters. The mobile device can include radios capable of communicating with a mobile/cellular network and TVWS network.

Block 508 includes the mobile/cellular network requesting association of one or more TVWS transceivers with the mobile device. A TVWS transceiver can include a receiver and/or transmitter. Association can occur by the mobile device sensing the TVWS transceivers. In other cases, association can occur by the TVWS transceivers sensing the mobile device and selecting the closest TVWS transceivers to use. Other techniques for selecting TVWS transceivers can be used.

Block 510 includes one or more associated TVWS transmitters transmitting audio and/or video content to the mobile device. In some cases, a combination of TVWS transmitters and mobile/cellular network can cooperate to transmit audio and/or video content to a mobile device. For example, a mobile/cellular network can transmit a base layer of content whereas a TVWS transmitter can transmit an enhancement layer of content. In some cases, the mobile/cellular network and TVWS transmitters can alternate transmitting content to the mobile device in some fashion.

Block 512 includes the mobile device or cellular/mobile network providing feedback to one or more TVWS transmitters concerning quality of audio and/or video content. The feedback can be determined at the mobile device and provided to one or more TVWS transmitters via a TVWS network or cellular/mobile network. For example, feedback can include link adaptation parameters such as any of FEC code rate, MIMO space-time modulation for the MIMO MCS scheme, and the precoding matrix Q determined based upon the received rate distortion information and statistical information stored at the transmitter for access by the channel encoder. In some cases, the feedback includes MIMO MCS scheme and precoding matrix Q.

In some cases, the feedback from the mobile device or cellular/mobile device includes rate distortion information.

Block 514 includes the one or more TVWS transmitters that transmitted multimedia content to the mobile device potentially adjusting link adaptation parameters based in part on the feedback provided in block 512. The feedback can be used to adjust parameters of channel encoder blocks in one or more TVWS transmitters.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Embodiments of the present invention may be implemented as any or a combination of: one or more microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method comprising:

providing, to a receiver in a first network from a service provider, a request for a transmission of multimedia content to the receiver from one or more transmitters in the first network;

receiving, by the service provider from the receiver in the first network, the request for the transmission of multimedia content using a first radio in the first network;

providing, to the receiver in the first network, an indication for the receiver to receive a transmission of at least a portion of the multimedia content from one or more transmitters in a second network;

determining link adaptation parameters of a channel encoder associated with the one or more transmitters in the second network;

providing the link adaptation parameters for transmission to a receiver associated with the one or more transmitters in the second network; and transmitting the at least a portion of the multimedia content from a second radio communicatively coupled to the one or more transmitters in the second network, wherein the one or more transmitters in the second network transmit signals using a portion of spectrum allocated for TV white space.

2. The method of claim 1, wherein the one or more transmitters and the receiver in the first network and the first network comply with one or more of: an IEEE 802.16-2009 published 2009.

3. The method of claim 1, wherein the providing of the indication for the receiver to receive to receive at least a portion of the multimedia content from one or more transmitters in the second network comprises receiving the indication through the first radio via the first network.

4. The method of claim 1, wherein the one or more transmitters in the first network transmit a base layer of the multimedia content and the one or more transmitters in the second network transmit an enhancement layer of the multimedia content.

5. The method of claim 1, further comprising:
  determining rate distortion information of the portion of the multimedia content transmitted using the second network; and
  providing rate distortion information for transmission to a receiver associated with the one or more transmitters in the second network.

6. The method of claim 1, wherein the link adaptation parameters include a MIMO modulation and coding scheme and wherein the MIMO modulation and coding scheme comprises at least one of: a modulation order; a forward error correction type and coding rate; and a space-time modulation technique.

7. The method of claim 1, wherein receiving the portion of the multimedia content from the second radio comprises: receiving the portion from one of a single frequency or different channels on the spectrum allocated for TV white space.

8. A system comprising:
  a display device;
  at least one antenna;
  a first radio;
  a second radio; and
  a processor configured to:
    provide, to a receiver in a first network from a service provider, a request for a transmission of multimedia content to the receiver from one or more transmitters in the first network;
    receive, by the service provider from the receiver in the first network, the request for the transmission of multimedia content using a first radio in the first network;
    provide, to the receiver in the first network, an indication for the receiver to receive a transmission of at least a portion of the multimedia content from one or more transmitters in a second network;
    determine link adaptation parameters of a channel encoder associated with the one or more transmitters in the second network;
    provide the link adaptation parameters for transmission to a receiver associated with the one or more transmitters in the second network; and
    process the at least a portion of the multimedia content received from the second radio communicatively coupled to the one or more transmitters in the second network, wherein the one or more transmitters in the second network transmit signals using a portion of spectrum allocated for TV white space.

9. The system of claim 8, wherein the one or more transmitters and the receiver in the first network and the first network comply with one or more of: an IEEE 802.16-2009 published 2009.

10. The system of claim 8, wherein the processor is further configured to:
  determine rate distortion information of the at least a portion of the multimedia content transmitted using the second network; and
  provide rate distortion information for transmission to a receiver associated with the one or more transmitters in the second network.

11. The system of claim 8, wherein the link adaptation parameters include a MIMO modulation and coding scheme and wherein the MIMO modulation and coding scheme comprises at least one of: a modulation order; a forward error correction type and coding rate; and a space-time modulation technique.

* * * * *